United States Patent [19]
Storck et al.

[11] 3,723,012
[45] Mar. 27, 1973

[54] HOLOGRAPHIC ALIGNMENT SYSTEM

[75] Inventors: Eckhard Storck, Munich; Joachim Ost, Martinsried, both of Germany

[73] Assignee: Siemens Aktiengesellschaft, Berlin and Munich, Germany

[22] Filed: Apr. 5, 1971

[21] Appl. No.: 130,971

[30] Foreign Application Priority Data

Apr. 8, 1970 Germany..................P 20 16 815.4

[52] U.S. Cl. ....................356/152, 350/3.5, 356/172
[51] Int. Cl. ..............................................G01b 11/26
[58] Field of Search ....350/3.5, 162 R; 356/125, 152, 356/141, 172; 250/201, 237 G

[56] References Cited

UNITED STATES PATENTS

| | | | |
|---|---|---|---|
| 3,612,698 | 10/1971 | Mathisen | 350/3.5 |
| 3,493,764 | 3/1970 | Graig | 356/125 |
| 3,590,640 | 7/1971 | Cindrich | 350/3.5 |
| 3,580,655 | 5/1971 | Leith et al. | 350/3.5 |

OTHER PUBLICATIONS

Leigh et al., Jour. of the Optical Society of America, Vol. 56, No. 4, April 1966, page 523.

*Primary Examiner*—David Schonberg
*Assistant Examiner*—Ronald J. Stern
*Attorney*—Hill, Sherman, Meroni, Gross & Simpson

[57] ABSTRACT

A method and apparatus for repositioning a body such as a diffuser body, hologram film or a body rigidly attached thereto in a previous position in a system characterized by making or exposing a hologram by use of reference wave and a wave coming from an object with each wave being of coherent radiation with a diffuser interposed in the path of one of the waves. The exposed hologram film is developed and repositioned in the system. Then either a wave from the object or the reference wave is projected on the hologram to reconstruct the other wave and the diffuser is located in the path of the same one wave to produce direct and diffused radiation. The intensity of the direct radiation of the reconstructed wave is measured to obtain a maximum measurement for the intensity of the direct radiation which will occur when the body is in the previously selected position. The body may be the diffuser and have a surface which will diffusely disperse the wave into direct and diffused radiation.

10 Claims, 5 Drawing Figures

HOLOGRAPHIC ALIGNMENT SYSTEM

BACKGROUND OF THE INVENTION

1. Field of the Invention

The present invention is directed to a method and apparatus for accurately repositioning a body in a previous position.

2. Prior Art

Experimenters and technicians are often faced with the problem of precisely repositioning a body in the relative three-dimensional position that it previously had during a previous positioning thereof. For example, in a holographic interferometry method, the hologram must be repositioned in its previous position after a photographic development in order for it to be utilized in the interferometric device. Another example is when parts are removed from a precision structure possibly for machining or other processing and then they must be repositioned in the structure which may occur in the case of the production of micro-circuits by a multiple masking process or in the case of precision processing of optical components. In all of these situations, repositioning was required by manual adjustments which are both cumbersome and complicated.

In holographically interferometric methods, a hologram taken of an object and the object itself are compared with the image reconstructed from the hologram being superimposed on the object. Any differences in the surface of the object such as created by subsequent machining or deformation create interference fringes which appear as dark lines or patches due to light interference. As discussed in an article by R. E. Brooks et al. entitled "Interferometry With a Holographically Reconstructed Comparison Beam", *Applied Physics Letters*, Volume 7, No. 9, Nov. 1, 1965, Pages 248 and 249, a holographic interferometric method makes it possible to determine the degree of misalignment of a transparent body from the position it occupied during the exposure of the hologram carrier or film. The misaligned body, such as a prism discussed in the article, has a superimposition of the waves originating from it and reconstructed from the hologram which superimposition produces interference fringes or lines located more or less tightly together. By increasing the distance between the interference fringes, a precise adjustment of the body to its original position which it while making the hologram can be accomplished. However, such a method only enables the alignment of the bodies with certain optical properties such as being transparent to light or being a light reflecting body. Furthermore, the necessary adjustments of the position of the article in order to cause the pattern of interference strips or fringes to disappear as completely as possible is very cumbersome to the observer because the adjustment of the body must take place in all six degrees of freedom (three each for translation and rotation). Thus displacement in one translation direction or about one rotational axis often is connected with an increase of interference fringes at one or more spots in the superimposed image.

As explained in an article by Emmet N. Leith and Juris Upatnieks "Holographic Imagery Through Diffusing Media" *Journal of the Optical Society of America*, Volume 56, Number 4, April, 1966, Page 523, the use of a diffuser during formation of a hologram requires the use of the same diffuser in the exact relationship when a holographic image is being reconstructed. If the diffuser is not in coincidence with its previous position or has undergone either a change in physical properties or a chemical change, the reconstructed waves from the hologram will no longer be directed to reconstruct an image, but will diverge diffusely in all directions.

SUMMARY OF THE INVENTION

The present invention is directed to a method and apparatus utilizing a holographic method for adjusting and repositioning any body or member into a previously existing position by observing a single condition such as the magnitude of intensity of the direct or non-diffused coherent radiation from the hologram used with a diffuser. If the hologram and diffuser are in the correct orientation with each other which is in coincidence with the orientation at the time of forming the hologram, the intensity of the direct radiation direct radiation, the member which is to be repositioned and which members can be directional radiation the member to be repositioned, which member can be the diffuser, hologram or body attached thereto, can be rotated or moved in translation until a maximum intensity reading occurs. In one embodiment, the member being repositioned has a reflecting surface which is used for diffusing the wave of coherent radiation. Another embodiment includes focusing means for focusing the direct radiation and includes filter means for filtering out the non-focused diffused radiation to reduce the background noise created by the diffused radiation. The apparatus for performing the relocation of the member can include means for producing an error signal dependent upon the measured intensity and the rate of change in the measured intensity which error signal is utilized to control means for moving the member in the six degrees of freedom to the proper position.

DESCRIPTION OF THE PREFERRED EMBODIMENT

Figure 1:
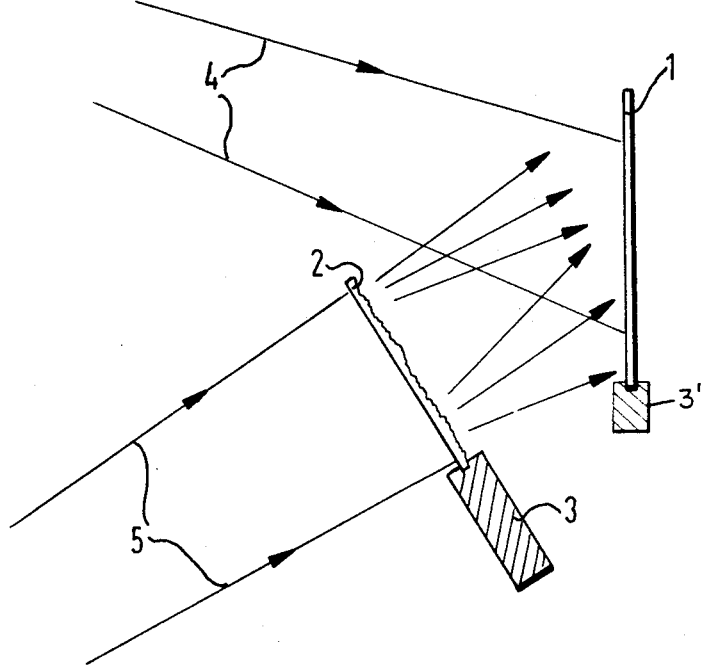
FIG. 1 shows a schematic presentation of an arrangement for forming a hologram utilizing a diffused wave.

The principles of the present invention are illustrated in a system for readjusting a body 3 with respect to a holographic film or carrier 1 and a diffusing member 2 although the principles would be utilized in repositioning either the holographic film 1 with respect to the diffuser 2, or the diffuser 2 with respect to the holographic film 1 or an object which is utilized in an interferometric method.

In forming the hologram a reference wave 4 of coherent radiation from a laser device, which is commonly used in forming holograms, is projected onto an unexposed film 1 supported by film carrier or member 3'. A second or object wave 5 of the same coherent radiation, which object wave 5 was reflected from an object or passed therethrough, is passed through a diffusing means such as diffuser member 2 and is simultaneously projected with the reference wave 4 on the unexposed film 1 of the hologram. The body 3 is illustrated as being firmly connected to the diffusing member 2; however, it could also be firmly connected to the carrier 3' for the hologram film 1. After the exposing of the film, it is removed from the hologram film carrier or member 3' and developed.

Figure 2:
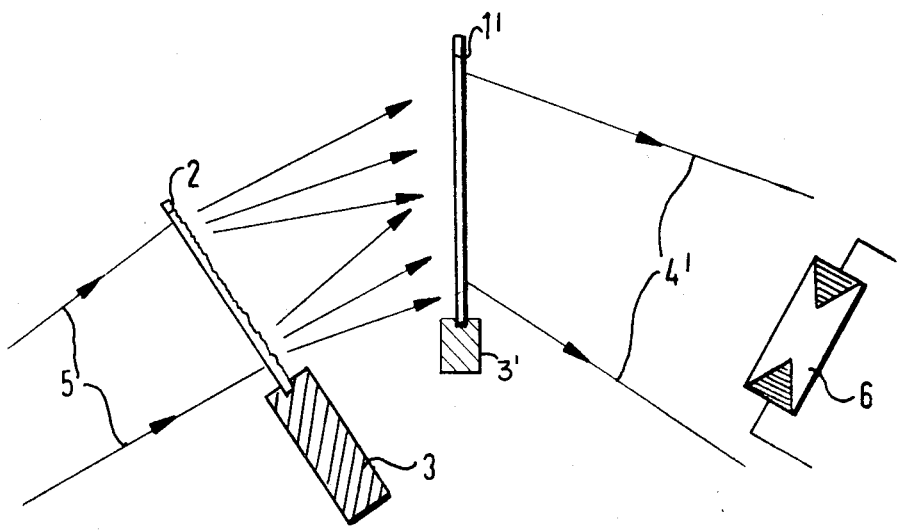
FIG. 2 is a schematic presentation of one method for reconstruction of the hologram with directed waves.

One method and apparatus for repositioning the body such as 3 is best illustrated in FIG. 2 and utilized the object wave 5 from the object passing through the diffuser 2 and projected on the developed hologram film 1' with the resulting reconstructed wave 4' being directed onto means for measuring the intensity such as a photo-detector 6. As illustrated, the wave 5 when passing through the diffuser 2 is changed into rays of direct radiation and rays of diffused radiation which are modulated by the hologram film 1' into waves 4' which has directed radiation for reconstructing the reference wave. As mentioned above, the position of the diffuser member 2 and thus the body member 3 must be in coincidence with the spatial relationship of the diffuser member 2 with the unexposed film 1 at the time of forming the hologram. Any misalignment either in the translational directions along the x, y and z axes or in rotation about these axes will cause diffusion of the waves 5 and a lowering of the intensity of the radiation in the wave 4' which radiation is measured by the photo-detector device 6. Furthermore, as mentioned in the above described article by Leith, physical changes in the diffuser member 2 or substitution of another diffuser member therefor will cause changes in the diffusion of the wave 5 which will prevent a reconstruction of the reference wave 4' from the hologram 1'.

Figure 3:
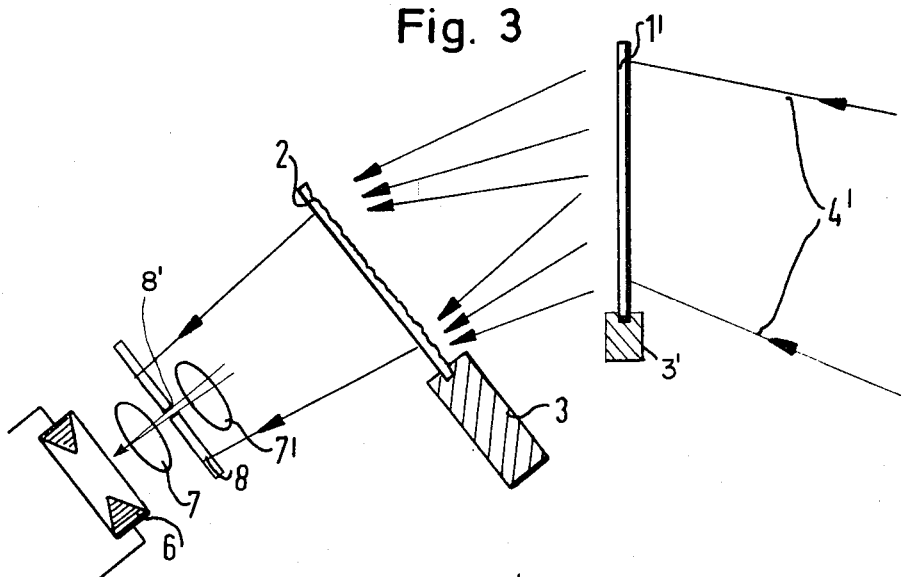
FIG. 3 is another schematic presentation of another method for reconstruction of the hologram with directed waves.

Another embodiment of the method and apparatus for repositioning a body such as 3 is illustrated in FIG. 3. In this embodiment, an inverted reference wave 4' is modulated by a hologram 1' and subsequently modulated by the diffuser member 2 prior to being detected by the photoelectric device 6. The orientation between the diffuser member 2 and the hologram 1' must be in coincidence to the previous orientation at the time of forming the hologram in order for a high intensity of the direct radiation to occur. In the method and apparatus illustrated in FIG. 3, focusing means including a pair of focusing lenses 7 and 7' aligned to have a joint or common focal point with a filtering means comprising a partition 8 having an aperture 8' located between the two lenses 7 and 7' with the aperture being at the joint focal point of the lenses is utilized for focusing the direct or nondiffused waves. The filter 8 will filter out the non-focused diffused radiation which results in reducing the background radiation and increases the ratio between the direct and diffused radiation detected by the device 6.

Figure 4:
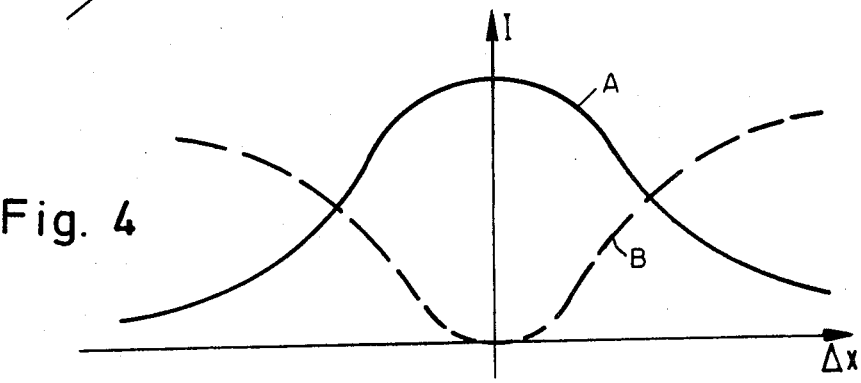
FIG. 4 is a graph of the intensity of the directed and of the diffused radiation as a function of the misadjustment of a member from the previous position.

In FIG. 4, the relationship of intensity I for either the direct or diffused radiation with the distance $\Delta x$ of misalignment. The curve A represents the intensity of the direct radiation and the curve B represents the intensity of diffused radiation. As illustrated by curve A, the intensity of the direct radiation passing through the hologram 1' and diffuser 2 increases as the distance $\Delta x$ of misalignment in either direction decreases. Conversely the intensity of the diffused radiation (curve B) decreases as the distance $\Delta x$ of misalignment decreases in either direction. Thus, when the alignment of the body 3 is in coincidence with the previous position, the intensity of the direct radiation assumes a maximum while the intensity of the diffused radiation assumes a minimum as illustrated by the curves A and B.

Figure 5:
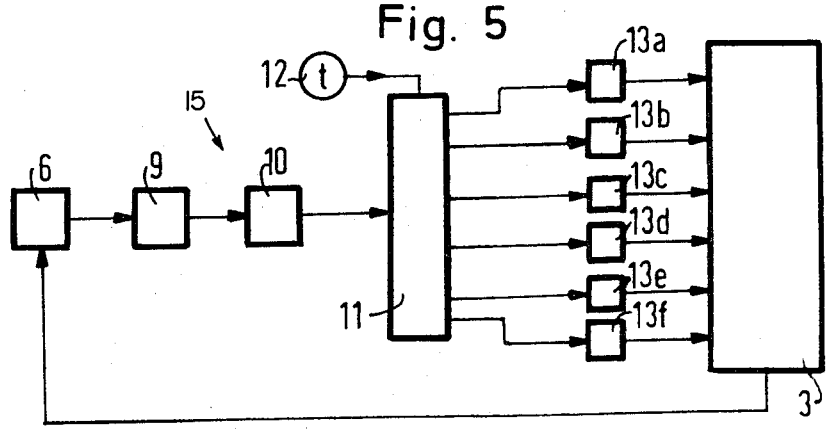
FIG. 5 is a block circuit diagram for automatically adjusting the position of the member.

To utilize the information or the measurement of the intensity of the direct radiation which information or measurement is produced by the means for detecting and measuring intensity 6, means for moving the body 3 such as an automatic adjusting system indicated at 15 in FIG. 5 is utilized. As illustrated, an automatic adjusting system for repositioning the body 3 includes the photo-detector 6, a differentiating means 9, a signal transmitter 10, a switch device 11, a time transmitter 12 and six adjustment motors 13a–13f for moving the body 3 in each of its six degrees of freedom. The photo-detector 6 measures the intensity of the radiation and produces an electrical output signal which is fed to a differentiating means 9, which determines the rate of change in the intensity measurement. The adjustment of the body 3 in one of its degrees of freedom is accomplished when the output signal of the photodetector 6 traverses a maximum measurement and the rate of change traverses a zero value. The signal transmitter 10 is connected to the differentiating means 9 and receives an error signal therefrom to cause a corresponding movement of one of the adjustment motors 13a–13f, which motor is connected through the switching unit 11 which may be a commutator. The time transmitter 12 operates the commutator of the switching device 11 so that each of the adjustment motors 13a to 13f will start to operate consecutively to adjust for misalignment in all six degrees of movement.

In operation, movement of an adjustment motor such as 13a move the body 3 in one degree of freedom and will cause changes in measurements of the intensity recorded by the detector 6. The motor is operated until a maximum intensity measurement is obtained with a minimum rate of change. After completion of the movement by the motor such as 13a, the time transmitter 12 moves the switching element 11 to operate the motor 13b to make a sweep in its particular degree of freedom to obtain the maximum reading from the detecting device 6. After going through each of the motors 13a through 13f, the body member such as 3 will be positioned at the particular desired point.

In the above discussion of the method and apparatus of the present invention, it was directed to relocating a body 3 which was attached to the diffusing member 2. As mentioned above, the body 3 may be the diffusing member and have a surface which will reflectively diffuse the radiation therefrom. The method and apparatus can also be utilized for repositioning the means 3' supporting the holographic film 1' in the correct relationship with the diffuser 2 after it has been exposed. As is obvious, to utilize the hologram in a holographic interferometric method, the position of the diffuser 2, the hologram 1' and the object of which the hologram was made must be in the same relationship and position as they were located when the hologram was made to avoid interference when superimposing the reconstructed image of the hologram with the image on the object. Thus the method and device can also be used to position the object while performing a holographic interferometric method.

Although minor modifications might be suggested by those versed in the art, it should be understood that we wish to employ within the scope of the patent warranted hereon all such modifications as reasonably and properly come within the scope of our contribution to the art.

What we claim is:

1. A method for repositioning a body into its former position after being disoriented therefrom comprising the steps of:
   providing means for supporting a hologram film and means for diffusing a wave of coherent radiation, one of the two means having a body rigidly connected thereto;
   providing an object wave of coherent radiation and a reference wave of coherent radiation;
   exposing the hologram film by simultaneously projecting both said object and reference waves onto one side of the film with one of the two waves being diffused by the diffusing means prior to the impinging onto the one side of the film;
   developing of the exposed film, and then resupporting the developed film on the means for supporting the film with the means for diffusing remaining at approximately the same position with respect to the means for supporting the film and with the one side of the film in approximately the same position with respect to the means for diffusing as during exposing of the film;
   projecting one wave selected from the object wave and the reference wave onto the developed hologram film to reconstruct the other wave while maintaining the diffusing means to diffuse the one wave which was diffused during exposing of the hologram;
   measuring at only one location only the intensity of the reconstructed wave; and
   adjusting the position of one means selected from the diffusing means and the means for supporting the film with respect to the other of the two means to obtain a maximum intensity of the reconstructed wave whereby when a maximum intensity is measured, said body is repositioned in the position with respect to the two means as the position that said body had during the exposing of the hologram.

2. A method according to claim 1, wherein the means having the body rigidly connected thereto is the diffusing means and wherein the body has a diffusingly reflecting surface to act as the diffusing means, wherein said body is adjusted with respect to the developed film to reposition the body to its previous position with respect to the means supporting the developed film.

3. A method according to claim 1, wherein the object wave is diffused prior to projection on the hologram film during the exposing thereof and wherein the wave projected on the developed film is the object wave which has been diffused prior to projection on the developed film.

4. A method according to claim 1, wherein the object wave is diffused prior to projection on the hologram film during exposing thereof, and wherein the one wave projected on the developed film is the reference wave which is projected on the hologram film to reconstruct the object wave which is then diffused by the diffusing means into direct and diffused radiation prior to measuring of the intensity of the object wave.

5. A method according to claim 4, wherein the measuring is the measuring of the intensity of the direct radiation of the object wave and which further includes the step of focusing the direct and diffused radiation and filtering out the diffused radiation prior to measuring the intensity of the direct radiation so that the measuring of the intensity of the radiation produces a measure of the intensity of the focused direct radiation.

6. An apparatus for relocating a body in a previous position by using a hologram made with an object wave and a reference wave of coherent radiation projected on one surface thereof with one of the two waves being diffused and the body was in the previous position, the apparatus consisting of:
   means for diffusing the one wave of coherent radiation into nondiffused and diffused radiation;
   means for supporting the hologram film with one surface substantially in the same position with respect to the means for diffusing as during the making of the hologram film;
   a body rigidly connected with one of the two means;
   means for supporting one of the above mentioned two means and enabling movement of said one means in space with respect to the other of the two means;
   means for projecting a selected wave of the two waves of coherent radiation on the exposed hologram film to reconstruct the other wave of the two waves of coherent radiation, said means for diffusing producing non-diffused and diffused radiation in the one wave as during the exposing of the hologram;
   means for detecting and measuring only the intensity of the reconstructed wave at only one location; and
   means for moving said one means to a position to increase the intensity of the radiation of the reconstructed wave to a maximum intensity whereby when a maximum intensity is obtained, the body is in its previous position.

7. An apparatus according to claim 6, wherein the means for projecting a selected wave projects the wave which is free of diffusion so that the reconstructed wave is directed at said diffusing means, and wherein the means for detecting and measuring includes means for focusing the nondiffused and diffused radiation of the reconstructed wave and means for filtering out the diffused radiation prior to being received by the means for detecting and measuring the intensity of the radiation of the reconstructed wave so that a background noise created by the diffused radiation is reduced to a minimum as the intensity of the nondiffused radiation is measured.

8. An apparatus according to claim 7, wherein the means for detecting and measuring the intensity of the nondiffused radiation includes means for providing a proportional error signal for the rate of change in the intensity measurement to obtain a maximum intensity measurement and wherein said means for moving includes means utilizing the error signal for moving said one means so that the proportional error signal approaches a minimum value.

9. A device according to claim 7, wherein the means for focusing and filtering include a pair of focusing lenses arranged to have a common focal point therebetween, and a partition having an aperture positioned with the aperture located at the common focal point of the lenses.

10. An apparatus according to claim 6, wherein the means for detecting and measuring the intensity of the radiation of the reconstructed wave includes means providing a proportional error signal for the rate of change in the intensity measurement to obtain a maximum intensity measurement and wherein the means for moving includes means utilizing the error signal for moving said one means so that the proportional error signal approaches a minimum value.

* * * * *

UNITED STATES PATENT OFFICE
CERTIFICATE OF CORRECTION

Patent No. 3,723,012                Dated March 27, 1973

Inventor(s) Eckhard Storck and Joachim Ost

It is certified that error appears in the above-identified patent and that said Letters Patent are hereby corrected as shown below:

In the Abstract, line 14, --and the measurements are utilized to make adjustments in the position of the body in all six directions of freedom (translational and rotational directions)-- has been inserted after "measured";

line 17, "The body may be" has been deleted;

lines 18 and 19 have been deleted.

Column 2, line 19, --will be at a maximum. By utilizing the measurement of the intensity of the-- has been inserted after "radiation";

line 21, has been deleted;

line 22, "member to be repositioned," has been deleted.

Signed and sealed this 2nd day of July 1974.

(SEAL)
Attest:

EDWARD M. FLETCHER, JR.
Attesting Officer

C. MARSHALL DANN
Commissioner of Patents